(12) United States Patent
Poblete Bustamante

(10) Patent No.: US 12,520,861 B2
(45) Date of Patent: Jan. 13, 2026

(54) METHOD FOR OBTAINING ANTIOXIDANTS, DIET FIBER, AND OTHER NUTRIENTS FROM PLANT BY-PRODUCTS

(71) Applicant: ASESORÍA, INVESTIGACIÓN Y PRODUCCIÓDE ALIMENTOS MAURICIO ANDRÉS POBLETE BUSTAMANTE EIRL, Molina (CL)

(72) Inventor: Mauricio Andres Poblete Bustamante, Lontue Molina (CL)

(73) Assignee: INNOVAGREEN ALIMENTOS SPA (CL)

( * ) Notice: Subject to any disclaimer, the term of this patent is extended or adjusted under 35 U.S.C. 154(b) by 486 days.

(21) Appl. No.: 18/000,768

(22) PCT Filed: Apr. 3, 2020

(86) PCT No.: PCT/IB2020/053224
§ 371 (c)(1),
(2) Date: Dec. 5, 2022

(87) PCT Pub. No.: WO2021/198740
PCT Pub. Date: Oct. 7, 2021

(65) Prior Publication Data
US 2023/0210152 A1 Jul. 6, 2023

(51) Int. Cl.
*A23L 33/14* (2016.01)
*A23L 19/00* (2016.01)
(Continued)

(52) U.S. Cl.
CPC ............. *A23L 19/07* (2016.08); *A23L 33/105* (2016.08); *A23L 33/14* (2016.08); *A23L 33/30* (2016.08); *A61K 36/73* (2013.01); *A61P 3/00* (2018.01)

(58) Field of Classification Search
CPC ........ A23V 2250/21; A23V 2250/5116; A23V 2200/00; A23V 2200/30; A23L 19/07;
(Continued)

(56) References Cited

U.S. PATENT DOCUMENTS

| 2005/0118312 A1 | 6/2005 | Lansky |
| 2007/0196550 A1 | 8/2007 | Weissman |
| 2012/0135109 A1* | 5/2012 | Paeschke ................ A23L 33/22 426/50 |

FOREIGN PATENT DOCUMENTS

| CN | 103988977 A | 8/2014 |
| CN | 104522306 A | 4/2015 |

(Continued)

OTHER PUBLICATIONS

CN-109511980-A, Bian J et al. English Machine Translation, Mar. 26, 2019, pp. 1-6 (Year: 2019).*
(Continued)

*Primary Examiner* — Hong T Yoo
(74) *Attorney, Agent, or Firm* — Patenting Consulting Group; Roberto J Rios

(57) ABSTRACT

The present invention relates to the technical field of foods and additives that are derived from edible plants. Particularly, the present invention relates to a method for obtaining a product rich in antioxidants, dietary fiber and other nutrients from by-products of edible plants such as dehydrated pulps and juices derived from fruits and vegetables, obtaining thus a first liquid product (first liquid phase), a second liquid product (second liquid phase), and a first and second solid phases, all of them with multiple beneficial health properties. One of the main effects observed when an individual consumes these products, is a normalization in the levels of triglycerides, total cholesterol, and HDL, and the body weight of this individual is maintained even when under a regime of fat diet.

6 Claims, 5 Drawing Sheets

(51) Int. Cl.
*A23L 33/00* (2016.01)
*A23L 33/105* (2016.01)
*A61K 36/73* (2006.01)
*A61P 3/00* (2006.01)

(58) Field of Classification Search
CPC ..... A23L 2/02; A23L 2/52; A23L 2/08; A23L 33/14; A23L 33/105
USPC .................. 426/599, 385, 541, 7, 62, 15
See application file for complete search history.

(56) References Cited

FOREIGN PATENT DOCUMENTS

| | | | | |
|---|---|---|---|---|
| CN | 109511980 A | * | 3/2019 | ............. A23L 19/01 |
| GB | 2506667 A | | 4/2014 | |
| KR | 100778886 B1 | | 11/2007 | |
| KR | 101219565 B1 | | 1/2013 | |
| RU | 2702860 C2 | | 10/2019 | |
| WO | 2003042133 A1 | | 5/2003 | |
| WO | 2004056444 A1 | | 7/2004 | |
| WO | 2012078798 A1 | | 6/2012 | |

OTHER PUBLICATIONS

Ajila, C.M. et al.: "Solid-state fermentation of apple pomace using Phanerocheate chrysosporium—Liberation and extraction of phenolic antioxidants", Food Chemistry, vol. 126, No. 3, Jun. 1, 2011 (Jun. 1, 2011), pp. 1071-1080, XP027601011.
Comfort, S.: "When is Fermentation finished", May 9, 2012 (May 9, 2012), pp. 2-4, XP055917458, Retrieved from the Internet URL:https://morewinemaking.com/articles/Marking_the_end_of_fermentation.
Joshi V.K. et al.: "Solid state fermentation of apple pomace for the production of value added products", Natural Product Radiance, vol. 5, No. 4, 2006, pp. 292, XP055917463.
Sadh, P.K. et al.: "Fermentation: A Boon for Production of Bioactive Compounds by Processing of Food Industries Wastes (By-Products)", Molecules MDPI, Oct. 8, 2018 (Oct. 8, 2018), XP055917467.

* cited by examiner

METHOD FOR OBTAINING ANTIOXIDANTS, DIET FIBER, AND OTHER NUTRIENTS FROM PLANT BY-PRODUCTS

TECHNICAL FIELD

The present invention relates to the technical field of foods and additives that are derived from edible plants. Particularly, the present invention relates to a method for obtaining a product rich in antioxidants, dietary fiber, and other nutrients from by-products of edible plants.

BACKGROUND OF THE INVENTION

It is estimated that a third of the world's food is wasted for different reasons, either due to problems in the supply chain or due to the discard of those products that are not considered optimal. In the case of fruits and vegetables this value is even higher, with an estimate of loss that reaches 55% (Eguillor Recabarren P. Pérdida y desperdicios de alimentos: diciembre de 2017. Oficina De Estudios Y Politicas Agrarias. Ministerio de Agricultura. Gobierno de Chile).

Discarded fruits and vegetables still contain a large amount of nutrients such as vitamins, minerals, antioxidants, dietary fiber, and phytosterols. For this reason, these wastes have been reconsidered as sources of nutrients that can be extracted and marketed in different industries such as the nutraceutical, cosmetic, chemical, etc. industry.

In order to extract said nutrients from fruit and vegetable waste, there are various extraction techniques in the state of the art that can be implemented to obtain antioxidants, dietary fiber, and other nutrients. For example, methods based on the application of heat (dehydration or spray dried), solvent extraction methods (polar and/or non-polar), or by lyophilization processes can be used.

Patent document WO 2004/056444 A1 describes a process for extraction of antioxidant compounds from pomegranate fruit waste using organic solvents and purification of antioxidants by silica gel column chromatography and reverse phase HPLC.

Patent document WO 2003/042133 A1 describes a process for the extraction of phenolic antioxidants from fruit and/or vegetable waste without the use of organic solvents. To do this, ground fruit and/or vegetable waste is subject to a high temperature system, preferably in a range between 125° C. to 220° C. Patent document GB 2506667 describes a method for the extraction of antioxidant compounds from fruit waste that requires mixing said fruit in water at a temperature between 70° C. to 100° C. and for obtaining the extract of antioxidants.

However, these methodologies have multiple disadvantages that make the final product obtained highly expensive, or that said final product is not of optimal nutritional quality for humans. For example, excess heat can affect the molecular structure of the nutritional compounds of interest and maintain the sugar content present in fruits, which is highly undesirable as it could be harmful to health. Similarly, lyophilized processes do not reduce the amount of sugars present in fruits, so the final product obtained in the form of a powder is capable of attracting moisture from the environment, which makes it not stable over time, and therefore preservatives or other additives must be added to said final product. On the other hand, solvent extraction techniques commonly use solvents such as ethanol, methanol, hexane, and the like, thus obtaining residues that are toxic and harmful to the health of the people who carry out these procedures as well as for the environment. Furthermore, traces of these solvents may be found in the final product, which is harmful to consumers.

The document KR100778886 B1 discloses a method for preparing a fermented product of fruit and vegetable, a fermented product of fruit and vegetable prepared by the method, and a feed composition and a deodorant composition containing the fermented product, which are provided to improve antibacterial activity, probiotic activity and deodorant activity. A method for preparing a fermented product of fruit and vegetable comprises the steps of roughly pulverizing a fruit, a vegetable, or a mixture thereof, adding purified water at 60-65% by weight of the fruit, the vegetable, or the mixture thereof, adding sugar by 10-14 Brix, and stirring the mixture; inoculating yeast to the obtained mixture and fermenting it for 6-10 days, first; and inoculating *lactobacillus* to the fermented one and fermenting it for 10-14 days, secondly.

On the other hand, document KR101219565 B1 describes a producing method of a feed additive using apple by-products, and the feed additive are provided to improve the weight gain rate of domestic animals and the feed efficiency. The disclosed method comprises the following steps: preparing the apple by-products; preparing a *Lactobacillus plantarum* culture fluid; injecting the *Lactobacillus plantarum* culture fluid into the apple by-products; and fermenting the mixture in the anaerobic condition.

Therefore, although there are interesting alternatives to solve the problem of the use of waste from the agricultural industry, new methods are required for obtaining food or nutraceutical products from by-products of edible plants that have been discarded for commercialization and that have low sugar content and high nutritional value, which are also environmentally friendly by not using or generating chemical compounds that are potentially harmful to the health of consumers.

SUMMARY OF THE INVENTION

The present invention provides a method for obtaining a product rich in antioxidants and dietary fiber from plant by-products, comprising the steps of:
  i. crushing (1) the plant by-products, thus obtaining a first mixture of a first solid phase and a first liquid phase;
  ii. separating (2) said first liquid and solid phases from said first mixture, preserving the first liquid phase for its ulterior use;
  iii. carrying out only one step of fermentation with a yeast (3) on said first solid phase under anaerobic conditions to achieve about 2°Bx;
  iv. stopping the fermentation by adding a yeast inhibitor (4) to the fermented first solid phase, thus obtaining a second mixture of a second solid phase and a second liquid phase; and
  v. separating (5) and recovering said second liquid and solid phases from said second mixture, which are rich in antioxidants and dietary fiber.

In a preferred embodiment, the plant by-products are vegetables or fruits, more preferably, they are selected from the group consisting in grapes, apples, pears, blueberries, raspberries, blackberries, strawberries, tomatoes, plums, and cherries, or mixtures thereof.

In another preferred embodiment of the method, the separation of the first and second liquid and solid phases is performed by compression.

In another preferred embodiment of the method, the yeast is *Saccharomyces cerevisiae* and it is inoculated at concentration of 0.05 to 0.2% (w/w) of the initial weight of the plant by-products.

In another preferred embodiment of the method, the yeast inhibitor is sorbic acid and it is added at a concentration of 0.05% to 1% (w/w) of the initial weight of the plant by-products.

In another preferred embodiment the second solid phase is dehydrated, with a temperature below 45° C. and during 24 to 48 hours.

As results of the method of the present invention, products rich in antioxidants and dietary fiber can be obtained, as well as other compounds of nutritive value from plant by-products, such as phytosterols and lycopene, which can be prepared from the second liquid or solid phases, or mixing in different proportions said liquid and solid phases.

In a preferred embodiment, the plant by-products used are waste fruits or vegetables selected from the group consisting in grapes, apples, pears, blueberries, raspberries, blackberries, strawberries, tomatoes, plums, and cherries, or mixtures thereof. In a further preferred embodiment, the plant by-products are a mixture of apples, pears and blackberries.

In another preferred embodiment, the second liquid phase is obtained from a mixture of apples, pears and blackberries, that comprises, in 100 ml of the second liquid phase, 47.9 mg of phytosterols, 24 mg of polyphenols expressed as gallic acid equivalents, 3.9 g of total dietary fiber and having an oxygen radical absorbance capacity (ORAC) of 250 µM/100 ml.

In another preferred embodiment, the second solid phase is obtained from a mixture of apples, pears and blackberries, that comprises, in 100 g of the second solid phase, 19.7 mg of phytosterols, 601 mg of polyphenols expressed as gallic acid equivalents, and 74.5 g of total dietary fiber and having an oxygen radical absorbance capacity (ORAC) of 34.11 µM/100 g.

In a preferred embodiment, the mixture of the second liquid phase and the second solid phase contains different proportions and/or concentrations of said solid and liquid phases. Preferably, the mixture of the second liquid and the second solid phases contains a dilution 1:10 of the second liquid phase mixed in a proportion of 1:1 with the second solid phase.

DETAILED DESCRIPTION OF THE INVENTION

The present invention relates to a method for obtaining nutraceutical products low in sugars and rich in antioxidants and dietary fiber, as well as obtaining other products of commercial interest, from edible plant by-products. The method of the present invention does not use solvents that are potentially toxic to health, nor does it require expensive equipment to obtain the desired final product, and by its use, it can make the most of by-products that are used as a substrate for microbial growth. Furthermore, this method uses only one solid fermentation step with a single microorganism, unlike what is described in the state of the art, making the present method a viable alternative for optimal use of plant waste.

Through this method, all kinds of waste derived from edible plants can be used, such as dehydrated pulps and juices derived from fruits and vegetables, obtaining a first liquid product (first liquid phase), a second liquid product (second liquid phase), and a solid first and second phases, all with multiple beneficial properties for health. One of the main effects observed when an individual consumes these products is a normalization in the levels of triglycerides, total cholesterol and HDL, and the body weight of this individual is maintained even when under a fatty diet.

The edible plant by-products that are used in the present method can be obtained from any fruit and/or vegetable that the food industry has tossed away, eliminated, or discarded because they did not meet the desired characteristics for marketing, but were not in a state of decomposition. In certain preferred embodiments, a type of fruit and/or vegetable, or a mixture thereof, is used. To obtain the products with the previously mentioned beneficial properties, it is preferable to use one or more types of fruit, for example, apples, pears, blackberries, sweet cucumber, grapes, blueberries, raspberries, strawberries, tomatoes, plums, cherries, among others and not limited to the mentioned examples. Preferably, waste of apples, pears, and blackberries as used first.

Figure 1:
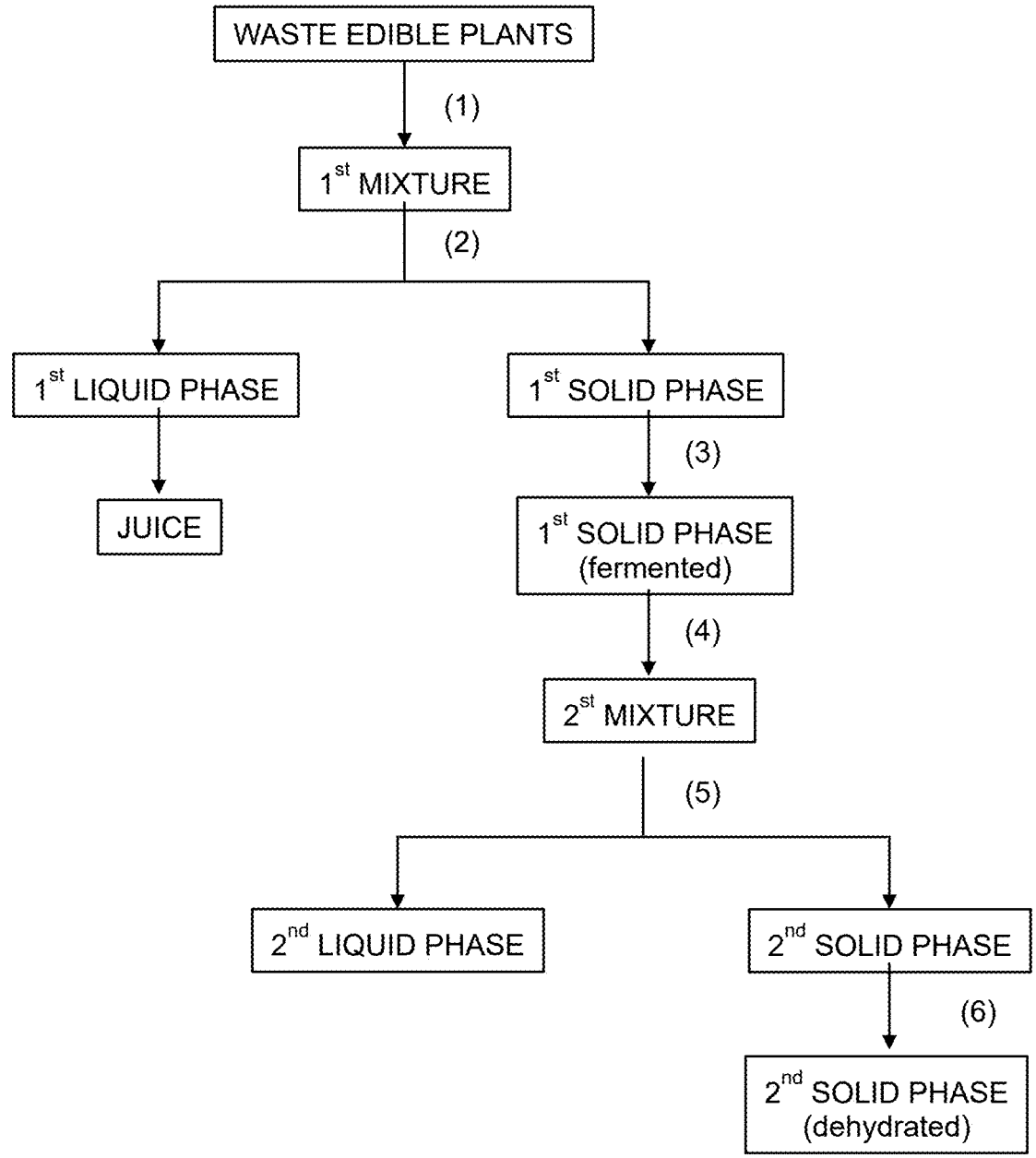
FIG. 1 shows a diagram of a preferred embodiment of the method for obtaining a product rich in antioxidants and dietary fiber from plant by-products.

The method of the present invention comprises a series of steps that show in the diagram of FIG. 1.

The first step of the method of the present invention comprises weighing and grinding (1) the by-products of the edible plants until a first mixture of a first liquid phase and a first solid phase are obtained. The grinding can be carried out by any physical method known in the state of the art, preferably by milling, preferably using a centrifugal fruit mill.

The next step of the present invention is to separate (2) the first liquid phase from the first solid phase of said first mixture, preserving the first liquid phase for later use. Preferably, the separation of said phases is carried out by compression, but any mechanical means known in the state of the art can be used for said purpose.

To make the most of all the by-products obtained through the method of the present invention, the first liquid phase obtained can be sterilized (for example, by pasteurization) and packaged for commercialization as fruit and/or vegetable juice.

On the other hand, the first solid phase undergoes a single fermentation process with a single microorganism, which will reduce the amount of sugars present in that phase. For this, a yeast inoculum is added to said solid phase and it is allowed to ferment (3) under anaerobic conditions, at a controlled temperature and for a suitable time, until said first solid phase has approximately 2°Bx (±2). In a preferred embodiment, the inoculum of said yeast is added in a ratio of 0.05% to 0.2% (w/w) with respect to the content by weight of the initial edible plants.

The yeast used in the present method is any yeast that is recognized as GRAS (generally recognized as safe), preferably a strain belonging to the genus *Saccharomyces*. In a preferred embodiment, the yeast used is a strain of the species *Saccharomyces cerevisiae*.

In a preferred embodiment, solid state fermentation can be carried out at a temperature range of between 8 and 24° C., preferably at 15° C. At that temperature, it is estimated that the sufficient time to obtain the desired Brix degrees is approximately between 4 and 5 days, shaking the culture at least once a day.

Once the first solid phase that has been fermented reaches approximately 2°Brix, the fermentation is stopped by adding a yeast inhibitor (4) and mixed, so that a second mixture of a second solid phase and a second liquid phase are obtained. In a preferred embodiment, said inhibitor is sorbic acid, but others such as benzoic acid, propionic acid, sulfurous anhydride, sodium metabisulfite, among others, can be used. After adding sorbic acid, a concentration range of between 0.05 to 0.1% (w/w) with respect to the initial weight of the by-products of edible plants, preferably in a concentration of 0.1% w/w. The mixture is homogenized and left to stand for approximately 1 hour.

Subsequently, from this second mixture, the second liquid phase and the second solid phase are separated (5). Said separation can be carried out in any way described in the state of the art, but it is preferably carried out by compression. The second liquid phase and the second solid phase are recovered, the liquid can be further concentrated by an appropriate method such as lyophilization or vacuum microwave treatment, and the solid is subjected to a low temperature dehydration process, between 42 to 53° C., to stabilize it (6), preferably 45° C., for 24 to 50 hours, preferably 48 hours, using any appropriate means such as a conventional oven with heat sink, vacuum microwave, infrared oven, among others.

A second object of the present invention is a product rich in antioxidants and dietary fiber that is obtained by carrying out the method previously described. From this method, mainly three products are obtained: a juice (corresponding to the first liquid phase), a liquid rich in phytosterols (corresponding to the second liquid phase), and a solid product (corresponding to the second fermented solid phase). Thus, through this method, it is possible to make the most of all the material from edible plants, delivering added value to each of the phases obtained.

In a preferred embodiment of the present invention, the product obtained through the disclosed method comes from the processing of apple, pear, and blackberry by-products, or a mixture thereof. The final product obtained of commercial interest can be each one of the liquid phases and the second solid phase separately, or a mixture thereof that is obtained as a result of the method of the invention.

When a mixture of apples, pears, and blackberries is used as the starting raw material, a product corresponding to the second liquid phase is obtained, which comprises 0.479 mg/ml of phytosterols, 0.024 mg equivalent of gallic acid/ml, and 390 mg/ml of total dietary fiber. From the same fruit combination, a product corresponding to the second solid phase is obtained, comprising 0.197 mg/g of phytosterols, 0.601 mg/g of gallic acid equivalents/g, and 745 mg/g of dietary fiber.

In another particular embodiment of the invention, the liquid and solid phases obtained are mixed in different proportions and/or concentrations. Preferably, the mixture of the second liquid phase and the second solid phase contains a 1:10 dilution of the second liquid phase mixed in a 1:1 ratio with the second solid phase.

The following examples are intended to illustrate the invention and its preferred embodiments, but should not, under any circumstances, restrict the scope of the invention, which will be defined by the claims appended herein.

EXAMPLES

Example 1. Obtaining a Product Rich in Antioxidants and Low in Sugars 10 kg of apples, 3.5 kg of pears from the Regional Supply Center (CREA) of Talca, and 1.5 kg of blackberries from the Colbun district in Chile were collected, washed, and crushed in a Recco brand juicing machine, adding 100 mL/500 grams of fruit, until obtaining a pulp. By compressing the pulp, the first liquid phase was separated from the first solid phase, thereby obtaining 1 L of the first liquid phase (juice), and 13 kg of the first solid phase.

The juice thus obtained was packaged and subsequently autoclaved under pressure conditions of 1.05 bar at 110° C. for 10 minutes.

To inoculate the solid phase, between 16 grams of yeast dissolved in 200 ml of distilled water plus 5 grams of sugar were used.

It is left at a temperature between 8 to 24° C. for 4 to 5 days, with daily agitation at least until the amount of °Brix reaches 2 or until the °Brix measurement of the previous day is repeated. Subsequently, sorbic acid is added (although other preservatives such as benzoic acid, sulfur dioxide, sodium metabisulfite, etc.) can be added at a concentration of between 0.05% to 0.1% (w/w) with respect to the initial weight of the by-products of edible plants. Subsequently, the mixture is compressed until obtaining 20% moisture of the second solid phase. The second liquid phase is stored for later use, while the second solid phase is left in ovens between 42 to 53° C. to achieve complete drying.

The second liquid phase is then concentrated in a rotary evaporator, in order to remove the alcohols, at a temperature of 55° C. at 100 rpm. Subsequently, the liquid is concentrated by different techniques such as lyophilization or by using vacuum microwaves, until the samples run out of water.

Example 2. Characterization of the First Liquid Phase and Second Solid Phase Obtained A characterization of the nutritional content of the liquid product (first liquid phase) and the solid product (second solid phase) obtained with the method described in Example 1 was performed. First, an organoleptic analysis of the phases was carried out, the characteristics of which are described in Table 1.

TABLE 1

Organoleptic characteristics of the solid and liquid phases.

| Characteristic | Solid sample | Liquid sample |
| --- | --- | --- |
| Appearance | Non-uniform fine granulometry powder | Liquid |
| Color | Red-purple | Purple color liquid |
| Flavor | *Sui generi* | Sweet and acid |

Table 2. Results of the Analysis of the Liquid Phase.

Additionally, the content of moisture, total ashes, proteins, total fat, total integrated dietary fiber, available carbohydrates, energy, and phytosterols were analyzed in both phases. Tables 2 and 3 show the results of the analysis of both phases.

| Parameter [2] | 100 mL |
| --- | --- |
| Moisture (g) | 96.5 |
| Ashes (g) | 0.4 |
| Proteins (g) [1] | 0.8 |
| Total fat (g) | No detectable (<0.05%) |
| Total dietary fiber (g) | 3.9 |
| Insoluble dietary fiber (g) | 1.8 |
| Total soluble dietary fiber | 2.1 |
| Soluble dietary fiber (HMW) (g) | 0.1 |
| Soluble dietary fiber (LMW) (g) | 2.0 |
| Available carbohydrates (g) | 0.5 |
| Energy (kcal) | 10 |
| Phytosterols | |
| B-Sitosterol (mg) | 47.9 |
| Campesterol (mg) | No detectable (<0.08%) |
| Stigmasterol (mg) | No detectable (<0.08%) |

[1] Nitrogen to protein conversion factor used 6.25
[2] Results obtained based on $\rho = 1.021$ g/ml (20° C.) determined in the laboratory

TABLE 3

Results of the solid phase analysis

| Parameter | 100 g |
| --- | --- |
| Moisture (g) | 11.6 |
| Ashes (g) | 1.8 |
| Proteins (g) [1] | 7.2 |
| Total fat (g) | No detectable (<0.05%) |
| Total dietary fiber (g) | 74.5 |
| Insoluble dietary fiber (g) | 54.9 |
| Total soluble dietary fiber | 19.6 |
| Soluble dietary fiber (HMW) (g) | 12.6 |
| Soluble dietary fiber (LMW) (g) | 7.0 |
| Available carbohydrates (g) | 4.9 |
| Energy (kcal) | 88 |
| Phytosterols | |
| B-Sitosterol (mg) | 19.7 |
| Campesterol (mg) | No detectable (<0.08%) |
| Stigmasterol (mg) | No detectable (<0.08%) |

[1] Nitrogen to protein conversion factor used 6.25

An analysis of the total polyphenol content and the oxygen radical absorption capacity (ORAC) was also carried out in both phases. The results of this analysis are shown in Table 4.

TABLE 4

Results of the analysis of total polyphenols and ORAC in the liquid and solid phases.

| Product (Phase) | Total polyphenols (equivalent mg of gallic acid/100 g or ml of sample) | ORAC (equivalent μmol Trolox ®/ 100 g or ml of sample) |
| --- | --- | --- |
| Liquid | 24 | 251 |
| Solid | 601 | 34.116 |

Example 3. Microbiological Analysis of the Solid Phases Obtained

A microbiological analysis of the solid products obtained by the previously described method was carried out. The presence or absence of coliforms and fecal coliforms was determined; determination of presence or absence of fungi and yeasts using the plate count technique; determination of presence or absence of aerobic mesophilic microorganisms using the plate count technique at 35° C.; and determination of *Salmonella* spp.

TABLE 5

Determination of coliforms and fecal coliforms in solid products.

| | NMP/ml | | E. coli |
| --- | --- | --- | --- |
| | Total coliforms | Fecal coliforms | NMP/ml |
| Sample #1 | <0.30 | <0.30 | <0.30 |
| Sample #2 | <0.30 | <0.30 | <0.30 |

TABLE 6

Determination of aerobes, fungi, yeasts, and *Salmonella* spp. in solid products.

| | Mesophilic aerobes (cfu/g) | Fungi (cfu/g) | Yeasts (cfu/g) | *Salmonella* 25 g (ausencia/presencia) |
| --- | --- | --- | --- | --- |
| Sample #1 | $2.2 \times 10^2$ | $1.0 \times 10^1$ | $1.0 \times 10^1$ | Ausencia |
| Sample #2 | $1.4 \times 10^2$ | $1.0 \times 10^1$ | $1.0 \times 10^1$ | Ausencia |

Both samples #1 and 2 of tables 5 and 6 correspond to the solid phases.

Example 4. Evaluation of the Body Fat Reducing Capacity of the Liquid and Solid Phases It was evaluated whether the products of the solid and liquid phases had a reducing effect on body fat in *Caenorhabditis elegans*. The mixture of the solid and liquid phases was analyzed at different doses, and it was also included in the analysis of the liquid phase at one dose (Table 7).

For sample preparation, the liquid phase was diluted in water (1:10), and then mixed with the solid phase (1:1). This mixture was added to the NG (Nematode Growth Medium) agar, tempered to the corresponding doses. In the case of the liquid phase, it was added on the surface of the NG agar.

TABLE 7

Samples analyzed in this study

| Sample | Dose |
|---|---|
| A. Phase + Liquid Phase | 0.25% |
| B. Solid Phase + Liquid Phase | 0.5% |
| C. Solid Phase + Liquid Phase | 1.0% |
| D. Solid Phase + Liquid Phase | 2.0% |
| E. Liquid Phase | 1.0% |

*C. elegans* accumulates fat in the form of drops in the intestinal and hypodermic cells that can be visualized by means of Nile Red staining (fluorescent).

The experiments were carried out with the *C. elegans* wild type N2 strain. Age-synchronized worms were obtained from pregnant adults, collecting the embryos in plates containing Nile Red (0.5 µg/ml). The different culture media that were used were:

NG medium+*E. coli* OP50 (control)
NG medium+*E. coli* OP50+Orlistat (6 µg/ml) (positive control)
NG medium+*E. coli* OP50+Sample The embryos were incubated under different conditions at 20° C. for 3 days. Once the young adult phase was reached, worm samples (120 worms/condition) were taken and the fluorescence emitted by spectrofluorometry was quantified. The assays were carried out in duplicate.

Figure 2:
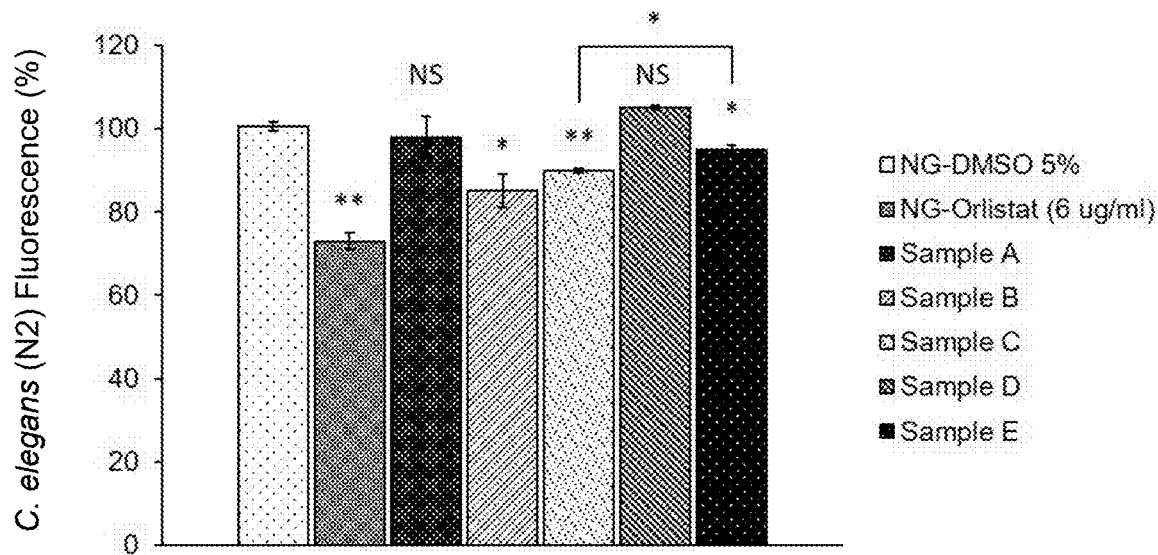
FIG. 2 shows a graphic with the fluorescence percentages of the *C. elegans* populations treated with different doses of the solid phase and/or liquid phase products.
Figure 3:
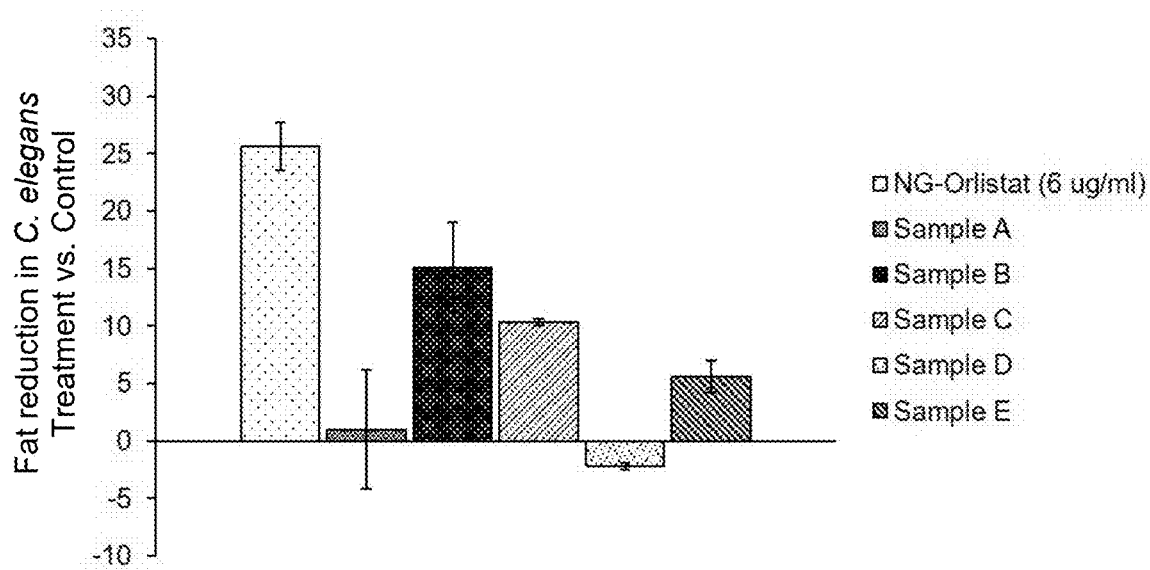
FIG. 3 shows a graphic with the reduction percentages of fluorescence in *C. elegans* populations treated with different doses of the solid phase and/or liquid phase products in comparison to control values (NG).

FIG. 2 shows the percentages of fluorescence obtained in populations of *C. elegans* subjected to feeding with the samples as described in Table 7. Table 8 and FIG. 3 show the percentages of fluorescence reduction obtained in each treatment with respect to the control condition (NG). The doses of samples B, C, and D resulted in a significant fluorescence reduction compared to the control conditions (15%, 10%, and 5.5% reduction, respectively) (P<0.05 and P<0.01).

TABLE 8

Percentages of fluorescence reduction obtained in each treatment with respect to the control condition (NG).

| Samples | Fat reduction of *C. elegans* vs. Control NG (%) | P-value |
|---|---|---|
| Orlistat (6 µg/ml) | 25.61 ± 2.1 | 0.004 |
| A (0.25%) | 0.99 ± 5.2 | NS |
| B (0.5%) | 15.10 ± 3.9 | 0.03 |
| C (1.0%) | 10.29 ± 0.3 | 0.009 |
| D (2.0%) | −2.23 ± 0.3 | NS |
| E (1.0%) | 5.57 ± 1.4 | 0.05 |

Example 5. Evaluation of the Effectiveness of the Liquid and Solid Phases in Decreasing Cardiovascular Risk Factors The effect of the liquid and solid phases on the decrease of cardiovascular risk factors in mice was analyzed. To do this, different diets were prepared for the animals with different percentages of liquid, solid, or mixture phase thereof, according to what is shown in Table 9.

TABLE 9

Types of diet under analysis

| Sample | Diet |
|---|---|
| DN | Normal diet |
| DG | Fat diet |
| DG S 5% | Fat diet + solid phase 5% |
| DG S 10% | Fat diet + solid phase 10% |
| DG S/L 5% | Fat diet + solid and liquid phase 5% |
| DG S/L 10% | Fat diet + solid and liquid phase 10% |
| DG L 5% | Fat diet + liquid phase 5% |
| DG L 10% | Fat diet + liquid phase 10% |

For the preparation of the different diets, the protocol described by Moore-Carrasco et al. 2008, Molecular Medicine Report 1(3): 401-405, May 2008 was used. Briefly, the commercial pellet was crushed and mixed with the extracts in the different proportions previously mentioned. This mixture was enriched with animal fat, vegetable fat, vegetable oil, casein peptone, and a vitamin pellet to balance the levels of vitamins and trace elements. The resulting pellets were analyzed to obtain their proximal formulation (Table 10).

TABLE 10

Proximate analysis of diets

| Sample | Moisture (%) | Fat (%) | Proteins (%) | Ashes (%) | Fiber (%) | Carbohydrates (%) |
|---|---|---|---|---|---|---|
| DN | 8.2 | 8.0 | 18.9 | 6.1 | 3.0 | 55.8 |
| DG | 28.5 | 28.3 | 19.2 | 5.6 | 4.0 | 14.4 |
| DG S 10% | 27.4 | 29.3 | 15.8 | 4.8 | 4.0 | 18.7 |
| DG S/L 10% | 26.2 | 27.8 | 17.8 | 5.5 | 3.0 | 19.7 |
| DG L 10% | 31.5 | 27.4 | 16.2 | 5.6 | 2.5 | 16.8 |
| DG S 5% | 27.2 | 26.8 | 17.7 | 5.1 | 2.7 | 20.5 |
| DG S/L 5% | 27.6 | 26.4 | 18.4 | 5.4 | 2.9 | 19.3 |
| DG L 5% | 27.0 | 28.0 | 18.1 | 5.5 | 3.0 | 18.4 |

Female mice of BALB/c strain between 25 to 35 g were used. Each diet (individual, mix, 5% or 10%) was tested in a group of 6 animals. Animals were kept at 22±2° C., in a regular 12:12 h light-dark cycle (light from 08:00 to 20:00 h). Animals were weighed every day for the first 10 days of testing, and then weighed every other day until the end of the experimental period. In addition, food intake and drinking water were measured. Access to food and water was free and bedding was changed three times a week. Each cage had a record of changes in behavior or intake that was filled out daily by the staff in charge. The aspects evaluated daily were: social behavior, piloerection, aggressiveness, anguish, anorexia and water intake. The model used to test the effectiveness of the liquid, solid, or mixed phases is the induction of cardiovascular risk factors through a hypercaloric diet. These animals, when fed with a diet that contains 25% fat, develop central obesity, hypercholesterolemia, hyperglycemia, among other disorders. At the end of the experimental period (day 40), the animals were sedated and anesthetized with an intraperitoneal injection of the mixture of Ketamine, xylazine, and acetopromazine. Once the animal was found to be in deep sleep, the peritoneal cavity was opened, blood was drawn from the abdominal aorta, and tissues such as the liver, heart, white adipose tissue (WAT), and skeletal muscle (gastrocnemius) were removed. These tissues were weighed and stored at −80° C. During the handling and administration of the different products, the animals remained calm, without alterations in their social behavior or aggressiveness between themselves or with the handlers. None of the products and combinations tested produced visible damage, irritation, or disturbances in social behavior. Neither did they present alterations in their body temperature, eating and digestive habits, not observing signs of diarrhea, pain, distress, among other evaluated parameters. There were no spontaneous deaths or signs of fights between the animals.

Figure 4:
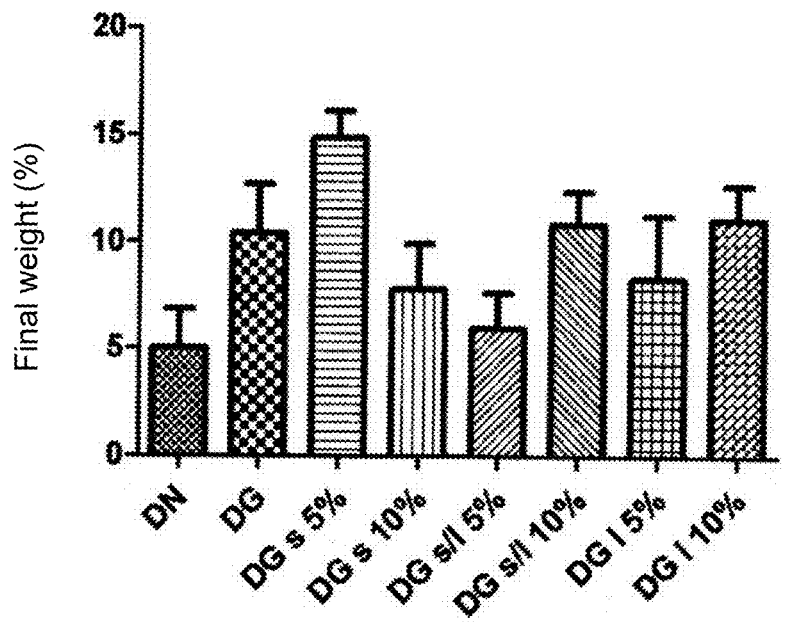
FIG. 4 shows a graphic with the weight increase in BALB/c mice treated with different diets, in percentage of the initial weight.
Figure 5:
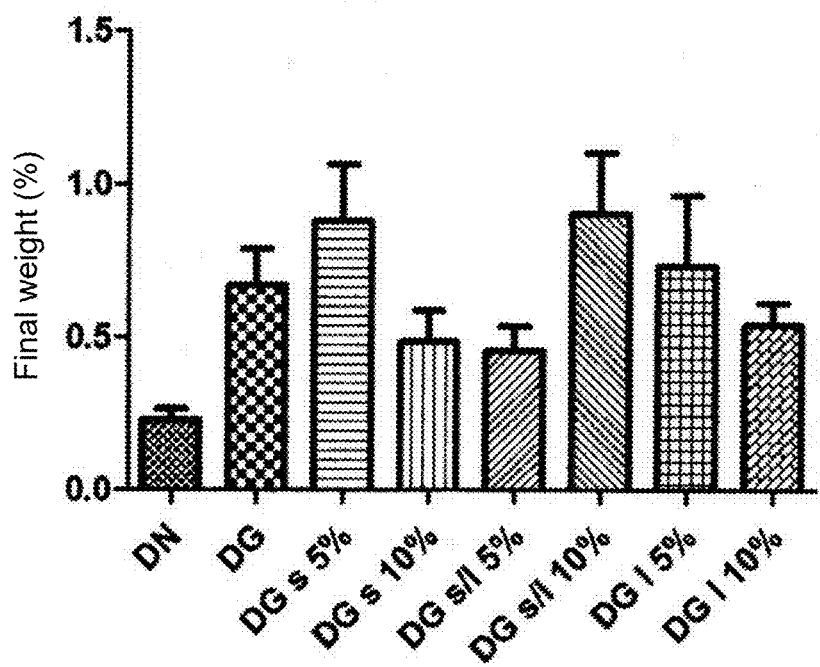
FIG. 5 shows a graphic with the results of the glycaemia measurements in BALB/c mice treated with different diets, in mg/dl.
Figure 6:
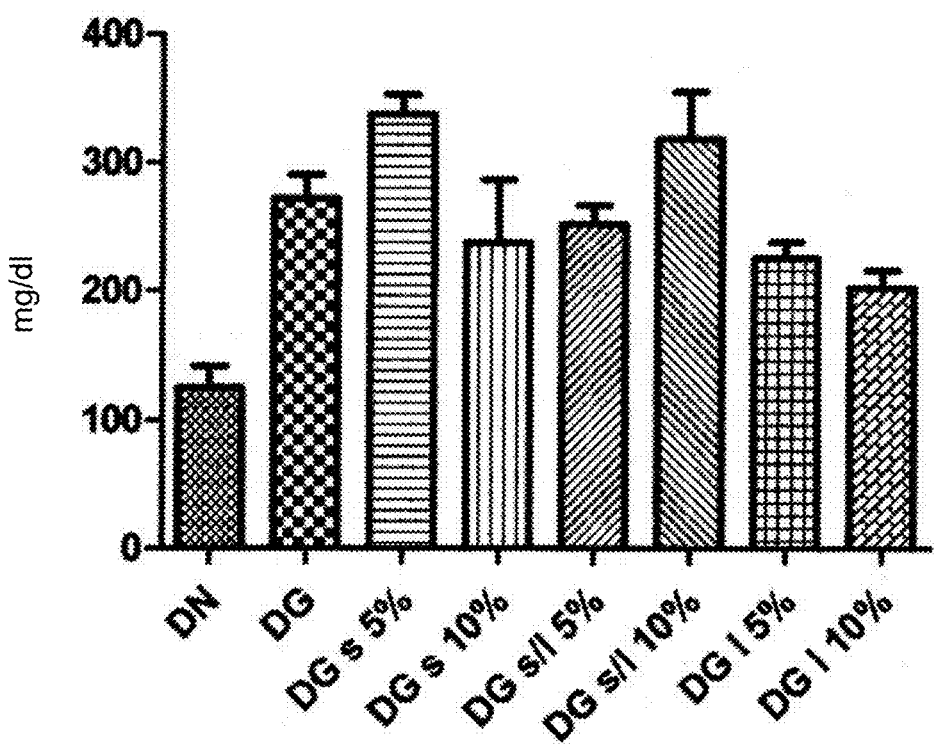
FIG. 6 shows a graphic with the results of the triglycerides measurements in BALB/c mice treated with different diets, in mg/dl.
Figure 7:
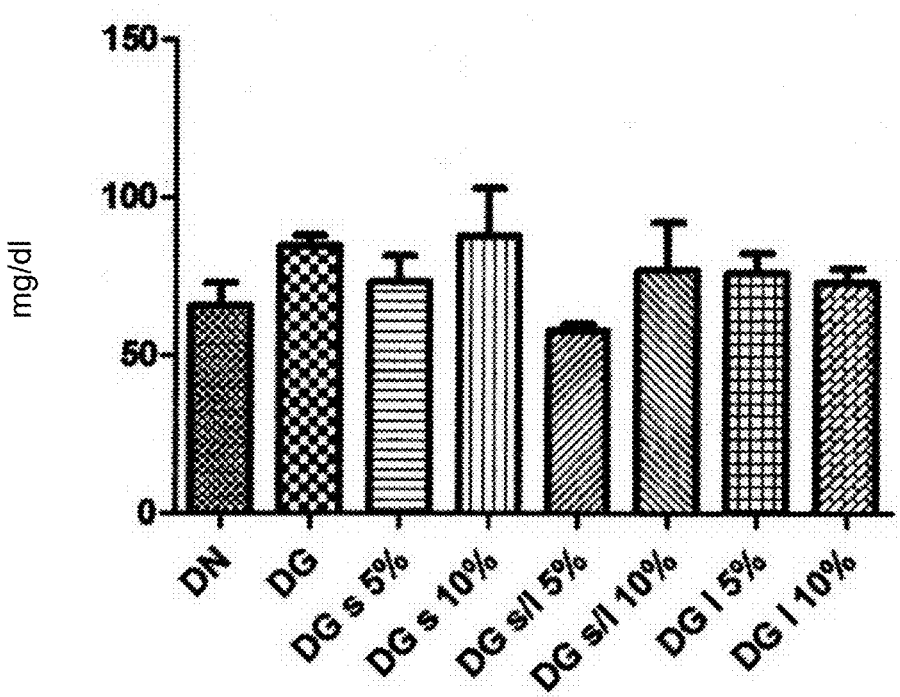
FIG. 7 shows a graphic with the results of the cholesterol measurements in BALB/c mice treated with different diets, in mg/dl.
Figure 8:
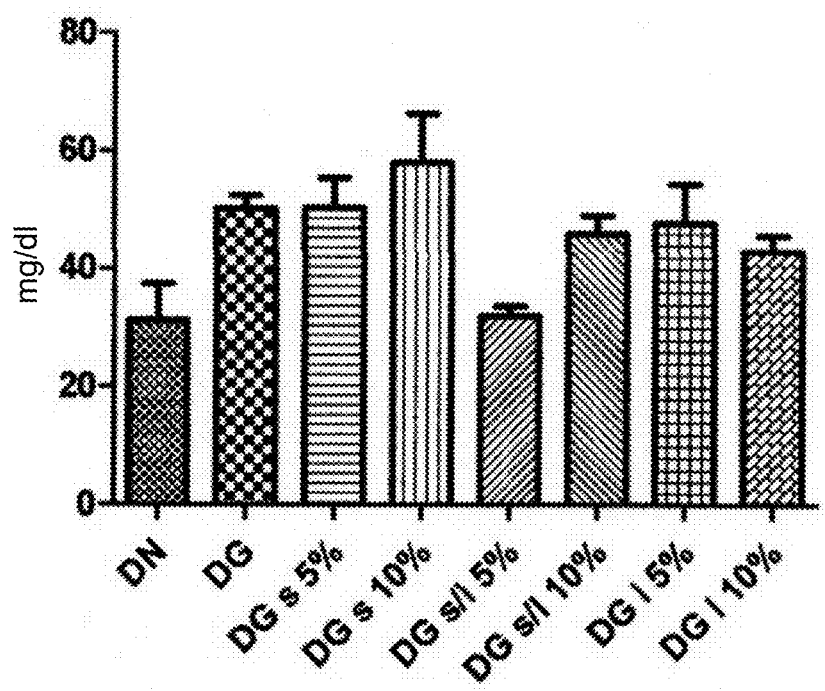
FIG. 8 shows a graphic with the results of the HDL cholesterol measurements in BALB/c mice treated with different diets, in mg/dl.

The administration of the different products and their mixtures in the groups of animals produced a partial improvement in some of the biochemical and anthropometric parameters. FIG. 4 shows a graph of the weight gain of the mice under the different treatments. It was observed that the animals that received the fat diet without any supplement (DG) drastically increased weight, unlike the animals that received the diet supplemented with the 5% solid/liquid phase (DG S/L 5%), which showed the smallest increase in body weight.

Visceral obesity is one of the main risk factors in the development of cardiovascular and metabolic diseases, and it is difficult to deal with given its low metabolic capacity. It is an interesting finding that the administration of the fat diet supplemented with the 5% solid/liquid reduces the accumulation of visceral fat in the treated mice.

Regarding the biochemical parameters, the administration of the diets supplemented with the 5% solid and liquid phases, shows the clearest trend towards the normalization of the parameters, equalizing the levels of triglycerides, total cholesterol, and HDL, in addition to showing a low glycemia compared to the other administered products (FIGS. 5-8).

The invention claimed is:

1. A method for obtaining nutraceutical products rich in antioxidants and dietary fiber from apples, pears, and blackberry by-products, comprising the steps of:
   i. crushing about 10 Kg to 20 Kg of apple by-products, about 3.5 Kg to 7.0 Kg of pear by-products, and about 1.5 Kg to 3.0 Kg of blackberry by-products, thus obtaining a first mixture of a first solid phase and a first liquid phase;
   ii. separating said first liquid phase and said first solid phases of said first mixture, preserving the first liquid phase for its ulterior use;
   iii. carrying out only one step of fermentation with a yeast on said first solid phase under anaerobic conditions to achieve about 2°Brix, thereby obtaining a fermented first solid phase;
   iv. stopping the fermentation by adding a yeast inhibitor to the fermented first solid phase, and mixing, thereby forming a second mixture of a second solid phase and a second liquid phase; and
   v. separating said second solid phase and said second liquid phases of said second mixture and recovering said second solid phase and said second liquid phase separately, said recovered second solid phase and said recovered second liquid phase comprising said nutraceutical products rich in antioxidants and dietary fiber.

2. The method of claim 1, further comprising the step:
   (vi) dehydrating said recovered second solid phase.

3. The method of claim 1, wherein the separation of the first liquid phase and the first solid phase separated in step (ii), and the separation of the second liquid phase and the second solid phase separated in step (v) is performed by compression.

4. The method of claim 1, wherein the yeast is *Saccharomyces cerevisiae* which is inoculated at a concentration of 0.05 to 0.2% (w/w) of an initial weight of the apples, pears, and blackberry by-products of step (i).

5. The method of claim 1, wherein the fermentation inhibitor is sorbic acid which is added at a concentration of 0.05% a 0.6% (w/w) of an initial weight of the apples, pears, and blackberry by-products of step (i).

6. The method of claim 2, wherein the recovered second solid phase is dehydrated at a temperature below 45° C. and for a duration of 24 to 48 hours.

* * * * *